United States Patent [19]

Calvani et al.

[11] Patent Number: 4,866,266

[45] Date of Patent: Sep. 12, 1989

[54] METHOD OF MEASURING POLARIZATION AND BIREFRINGENCE IN SINGLE-MODE OPTICAL FIBERS

[75] Inventors: Riccardo Calvani, Pinc Torinese; Renato Caponi, Turin; Francesco Cisternino, Turin; Gianni Coppa, Turin, all of Italy

[73] Assignee: Cselt - Centro Studi e Laboratori Telecomunicazioni S.p.A., Turin, Italy

[21] Appl. No.: 191,205

[22] Filed: May 6, 1988

[30] Foreign Application Priority Data

May 20, 1987 [IT] Italy .................. 67439 A/87

[51] Int. Cl.⁴ .................................. H01J 5/16
[52] U.S. Cl. .................................. 250/227; 356/73.1
[58] Field of Search .................. 250/227; 356/73.1; 350/96.1, 96.15

[56] References Cited

U.S. PATENT DOCUMENTS 4,675,521  6/1987  Sugimoto .................. 250/227
4,759,624  7/1988  Calvani et al. .................. 356/73.1

OTHER PUBLICATIONS

S. C. Rashleigh, R. H. Stolen; "Preservation of Polarization in Single-Mode Fibers"; Fiberoptic Technology May 1983; pp. 155, 156, 157, 158, 160, 161.

N. Chinone & R. Ulrich; "Elasto-Optic Polarization Measurement in Optical Fiber"; Optics Letters/vol. 6, No. 1/Jan. 1981; Optical Society of America; pp. 16, 17, 18.

OFC/100C '87/Thursday Morning/204; THD4 Fast Heterodyne Michelson Polarimeter for High-Precision-Fiber Birefringence Measurements; 1 page R. Calvani, R. Caponi, F. Cisternino (1987).

*Primary Examiner*—David C. Nelms
*Attorney, Agent, or Firm*—Herbert Dubno

[57] ABSTRACT

A constant force perpendicular to the fiber axis is applied to the fiber so as to cause a power coupling from the fundamental mode, which is guided, to a secondary mode which is irradiated, and the intensity of the scattered radiation associated with that secondary mode is measured. Such intensity depends on the local state of polarization. By dispacing the force application point step by step along the fiber axis and by measuring for each point the intensity of the scattered radiation, beat length is obtained as the distance between two consecutive points where the scattered radiation has the same intensity.

12 Claims, 1 Drawing Sheet

METHOD OF MEASURING POLARIZATION AND BIREFRINGENCE IN SINGLE-MODE OPTICAL FIBERS

FIELD OF THE INVENTION

Our present invention relates to the measurement of properties of optical fibers and, more particularly, to a method of detecting the local state of polarization and measuring birefringence in single-mode optical fibers.

BACKGROUND OF THE INVENTION

Optical fibers always exhibit a certain birefringence due to a difference of refractive index on two orthogonal axes (fiber birefringence axes). That difference arises both from the practical impossibility of manufacturing a perfectly circular fiber and from imperfections arising during the manufacturing process.

Birefringence causes a variation in the state of polarization of radiation propagating along the fiber. This phenomenon is characterized by a well-defined periodicity and a distance between two successive fiber points at which the propagating radiation presents the same state of polarization is called "beat length".

The knowledge of the birefringence characteristics of a single-mode optical fiber, and hence of the polarization of a radiation transmitted along the fiber, is necessary in applications of single-mode fibers where polarization is exploited. Among these applications we may cite optical communications, based on heterodyne or homodyne detection and requiring the interfering radiations (radiation containing the information and radiation emitted by a local oscillator) to have the same polarization, and optical-fiber sensors, in which fibers preserving a given state of polarization are used.

Various methods are known for detecting the local state of polarization in single-mode optical fibers and for measuring the birefringence of such fibers and, more particularly, for measuring polarization beat length in high birefringence optical fibers.

For example, "Preservation of polarization in single-mode fibers", by S. C. Rashleigh and R. G. Stolen, Laser Focus-Fiberoptic Technology, May 1983, pages 155–161, describes a method in which a fiber end is illuminated so as to equally excite both fundamental modes, the intensity maxima of the light scattered due to Rayleigh scattering are transversely observed, and the average distance of such maxima on a rather long fiber trunk is measured. Since the scattered radiation is polarized, the light emitted gives information as to local polarization and hence the calculated distance corresponds to beat length.

This method has the disadvantage of requiring a high-power source (e.g. 50–100 mW) in order to enable the scattered radiation to be detected without resorting to extremely sophisticated apparatus. Another drawback of this method is that it provides inaccurate measurements, since the exact location of said maxima is difficult to detect. Moreover, the optically inaccurate fiber cladding must be removed to allow good observation.

The need for high-power sources and fiber cladding removal is eliminated in another method described by N. Chinone and R. Ulrich in "Elasto-optic polarization measurement in optical fiber", Optics Letters, Vol. 5, No. 1, January 1981, pages 16–18.

According to that method, a transverse force is applied to the fiber and a polarization component is measured at the fiber output as a function of the force direction in a plane perpendicular to the fiber axis.

The polarization value at the force application point is derived from the value of the state of polarization measured at the fiber output. The method supplies only an indirect measurement of the local polarization, since the state of polarization changes from the point of application of the force to the fiber output.

It is then necessary to hypothesize a mathematical model of fiber polarization behavior by which the values measured at the output are to be evaluated to obtain the values of the local state of polarization. The method accuracy is bound by the precision of the hypothesized model.

OBJECT OF THE INVENTION

It is the object of the invention to overcome these drawbacks and provide an improved method, which allows a direct measurement of local polarization, without resorting to high power sources and requiring fiber cladding removal.

SUMMARY OF THE INVENTION

The present invention provides a method in which a polarized radiation is injected into the fiber and a localized deformation is induced in the fiber by applying a force perpendicular to the fiber axis which has such a strength as to cause a power coupling from the fundamental mode, which is guided by the fiber, to at least a secondary propagation mode, which is irradiated, and the intensity of the radiation transversely scattered because of said power coupling is measured.

The invention exploits the fact that the localized deformation causes a birefringence variation in the fiber with consequent reduction in the fiber guidance capacity in respect of the local polarization component parallel to the stress direction. Hence a fraction of the propagating radiation which is substantially proportional to this component is extracted through lateral scattering.

The information obtained from the measurement concerns one component alone of the scattered radiation. To exactly determine the state of polarization it is necessary to obtain information also on the perpendicular component. This can be obtained by subjecting the fiber to a deformation caused by a force perpendicular to the force previously described and measuring the intensity of the scattered radiation generated by the second perturbation.

According to another feature of the invention, the stress point is displaced along the fiber, the intensity of the scattered radiation as a function of the stress point is measured, and polarization beat length is determined as the distance between two consecutive points where the scattered radiation has the same intensity.

Advantageously, the measurement can be also repeated at different time instants.

Preferably, the analyzed radiation has a wavelength slightly shorter than the fiber cutoff wavelength. Under these conditions the scattered radiation is irradiated at a certain distance from the stress point. This is advantageous in case of beat length measurement, since the detectors can be placed so as not to hinder the movements of the stressing devices. On the other hand, the polarization information obtained is always relevant to the stress point.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
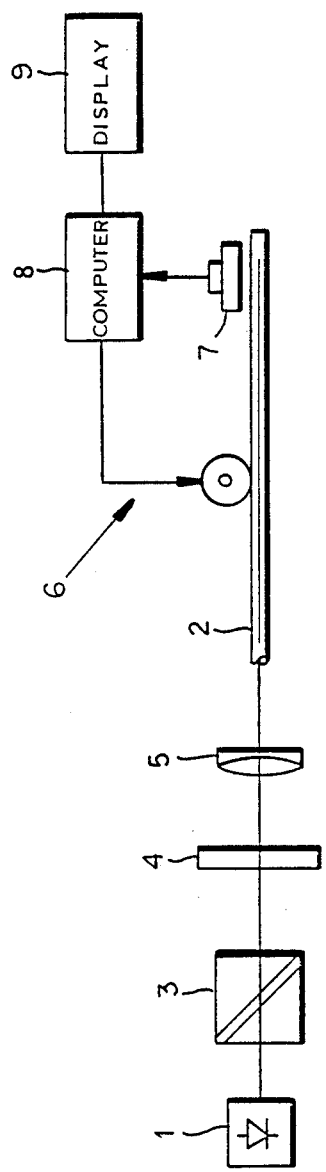
FIG. 1 is a schematic representation of the measuring apparatus.
Figure 2:
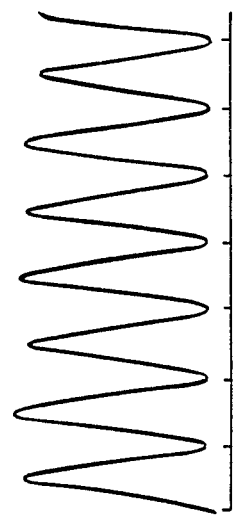
FIG. 2 is a diagram showing the scattered light intensity as a function of the point of application of the force.

Referring to FIG. 1, the apparatus comprises a quasimonochromatic light source 1, e.g. a standard 1 mW He-Ne laser, which emits a radiation with wavelength slightly shorter than the cutoff wavelength of the fiber 2 under test (e.g. about twenty nanometer less).

A Glan Taylor prism 3 (or a similar device), a quarter-wave plate 4 and an optical system 5 focusing the radiation leaving plate 4 onto the input of fiber 2 are located between source 1 and fiber 2.

Prism 3 and plate 4 cause a circularly polarized radiation to be present at the entrance pupil of fiber 2. Thus, whatever the direction of the fiber birefringence axes, the power transmitted along each of them is the same.

Fiber 2 can be either a high birefringence (or polarization-preserving) fiber, whose beat length is to be measured, or a conventional, low birefringence fiber, whose local polarization must be observed at one or more points.

A mechanical stressing system 6, schematically shown as a roller, acts on fiber 2 in order to apply a constant force to a fiber zone whose linear dimension along the fiber axis, is very small as compared to the beat length of a high birefringence fiber, typically of the order of 1/100 (one hundredth) of this length. The system 6 is provided with means for displacing the force application point along the fiber axis.

System 6 may be the system described by R. Calvani, R. Caponi and F. Cisternino in "Fast heterodyne Michelson polarimeter for high-precision-fiber birefringence measurements" presented at OFC/IOOC '87, Reno, January 1987, paper THD4.

That system comprises an idle roller, having a horizontal axis perpendicular to the fiber axis and a diameter such that the deformation may be considered point-like (e.g. a diameter of 1 cm). The roller is mounted on a lever and held in contact with the fiber by a weight carried by the lever. The lever is in turn pivotally mounted on a frame, which can be displaced in a controlled manner and has a base plate with a V-shaped groove housing the fiber. The features of mechanical system 6 are described in this publication but not shown in detail here.

The deformation caused by mechanical system 6 should be sufficiently strong to cause a power coupling from the fundamental mode, which is guided within the fiber core, to a secondary mode, which is irradiated and laterally scattered. This can be achieved by a weight of the order of 0.1 kg.

A detector 7 placed alongside the fiber collects the scattered light and is associated with a measuring and computing system 8 which measures the intensity of the collected radiation, obtains therefrom the beat length (in case of a high birefringence fiber), displays its behavior on the display 9, and controls the displacement of mechanical system 6.

Detector 7 has advantageously a rather large area, in order to collect as much scattered radiation as possible, and can be placed at a certain distance from mechanical system 6. In fact, by the choice made for the source wavelength, irradiation takes place at a distance from the stress point. In this way the detector does not hinder the displacement of mechanical system 6, which are of the order of some centimeters in the case of measurement of beat-length of high birefringence fibers.

In operation in the case of a low birefringence fiber, the mechanical system 6 is placed at the first point where the state of polarization is to be observed, a predetermined weight is placed on the lever and the scattered radiation due to the perturbation induced in the fiber is collected by detector 7. The intensity of the scattered radiation, which is proportional to the polarization component parallel to the direction of the applied force, is then determined by measuring and computing system 8. Mechanical system 6 and detector 7 are then moved to the subsequent measurement points, where the described operations are repeated. Various measurements can be performed at each point by using different weights. These measurements can be repeated at different time instants in order to detect polarization fluctuations in the various fiber points. This information is useful to the investigation of polarization noise.

The operations are perfectly analogous in case of measurement of polarization beat length in a high birefringence fiber. In this case, the step-by-step displacement of mechanical system 6 can be automatically controlled by the measuring and computing system 8. System 8 measures the intensity at each stress point and obtains beat length LB as the distance between two points where the scattered radiation has the same intensity. In this case detector 7 can be located at a fixed point at a few centimeters from the stress point, since the overall system displacement is also of a few centimeters. As an alternative, the detector can be made integral with the moving mechanical system so as to perform the measurement at a point near the stress point and at a fixed distance from it.

In this kind of fiber, the fiber length affected by the measurement will contain a high number of beat lengths (beat length in high birefringence fibers is of the order of a millimeter) and system 8 will supply, as the value of LB, an average of the measured values. Thus possible local fiber nonuniformities can be compensated. If it is desired also to compensate possible systematic errors in the measurement instruments and mechanical inaccuracies, the measurement can be repeated in the opposite direction or with different weights, and an average of the values obtained can be calculated again.

Besides, the information obtained by the measurement concerns only a component of the scattered radiation. If information on the perpendicular component is also desired, a deformation can be induced in the fiber by applying a force perpendicular to the preceding one and with such a strength as to cause said power coupling, and the intensity of the scattered radiation generated as an effect of said second deformation is measured.

It is evident that the above description is given only by way of nonlimiting example and that variations and modifications are possible without going beyond the scope of the invention.

We claim:

1. A method of detecting a local state of polarization in a single-mode optical fiber, comprising the steps of:
    injecting polarized radiation into said optical fiber;

applying a force to said fiber in a direction perpendicular to an optical axis thereof and of a strength sufficient to cause a power coupling from a fundamental mode of the radiation guided in said fiber to at least one secondary propagation mode which is irradiated from said optical fiber; and measuring intensity of radiation transversely scattered from said optical fiber as a result of the power coupling and which is proportional to an amplitude of a local polarization component parallel to the direction of force application.

2. The method defined in claim 1, further comprising the steps of:

applying to said fiber a second force perpendicular to the direction of application of the first-mentioned force and also perpendicular to said optical axis and of a strength sufficient to cause a power coupling to a secondary mode which is irradiated from said fiber as a second scattered radiation; and measuring laterally of said optical fiber an intensity of said second scattered radiation.

3. The method defined in claim 2 wherein the intensity measurements are repeated at different points along a length of said optical fiber and at different time instants.

4. The method defined in claim 3 for measuring birefringence of a high birefringence optical fiber, further comprising the step of determining a distance along said optical fiber between two successive points at which the scattered radiation has the same intensity and representing polarization beat length.

5. The method defined in claim 4 wherein the measurement is effected using a radiation with a wavelength slightly shorter than a cutoff wavelength of higher-order modes of the fiber.

6. The method defined in claim 3 wherein the measurement is effected using a radiation with a wavelength slightly shorter than a cutoff wavelength of higher-order modes of the fiber.

7. The method defined in claim 1 wherein the intensity measurements are repeated at different points along a length of said optical fiber and at different time instants.

8. The method defined in claim 7 for measuring birefringence of a high birefringence optical fiber, further comprising the seep of determining a distance along said optical fiber between two successive points at which the scattered radiation has the same intensity and representing polarization beat length.

9. The method defined in claim 8 wherein the measurement is effected using a radiation with a wavelength slightly shorter than a cutoff wavelength of higher-order modes of the fiber.

10. The method defined in claim 1 for measuring birefringence of a high birefringence optical fiber, further comprising the step of determining a distance along said optical fiber between two successive points at which the scattered radiation has the same intensity and representing polarization beat length.

11. The method defined in claim 10 wherein the measurement is effected using a radiation with a wavelength slightly shorter than a cutoff wavelength of higher-order modes of the fiber.

12. The method defined in claim 1 wherein the measurement is effected using a radiation with a wavelength slightly shorter than a cutoff wavelength of higher-order modes of the fiber.

* * * * *